United States Patent

[11] 3,565,092

[72] Inventor Harry Simister Bottoms
      Solihull, England
[21] Appl. No. 780,648
[22] Filed Dec. 3, 1968
[45] Patented Feb. 23, 1971
[73] Assignee Joseph Lucas (Industries) Limited
      Birmingham, England
[32] Priority Dec. 7, 1967
[33] Great Britain
[31] 55726/67

[54] SOLENOID OPERATED VALVE WITH PLURAL
      DIAPHRAGM SUPPORTS
      3 Claims, 1 Drawing Fig.
[52] U.S. Cl................................................. 137/83;
                                                      251/129
[51] Int. Cl............................................. F16k 31/10
[50] Field of Search........................................ 251/342,
                                              159, 129; 137/83

[56] References Cited
      UNITED STATES PATENTS
3,099,280  7/1963  HolzBock..................... 137/83
3,457,939  7/1969  Freeman ..................... 137/83

Primary Examiner—Arnold Rosenthal
Attorney—Halman & Stern

ABSTRACT: A valve comprising a pair of members having adjacent surfaces in which are formed respective apertures which can be mutually aligned and moved relatively to one another to move the apertures out of alignment, one of the members having an entry passage communicating with the aperture therein, said member being mounted upon a resilient tube formed a continuation of the entry passage and having an adjusting device arranged to move the member so that the surfaces are moved towards and away from one another.

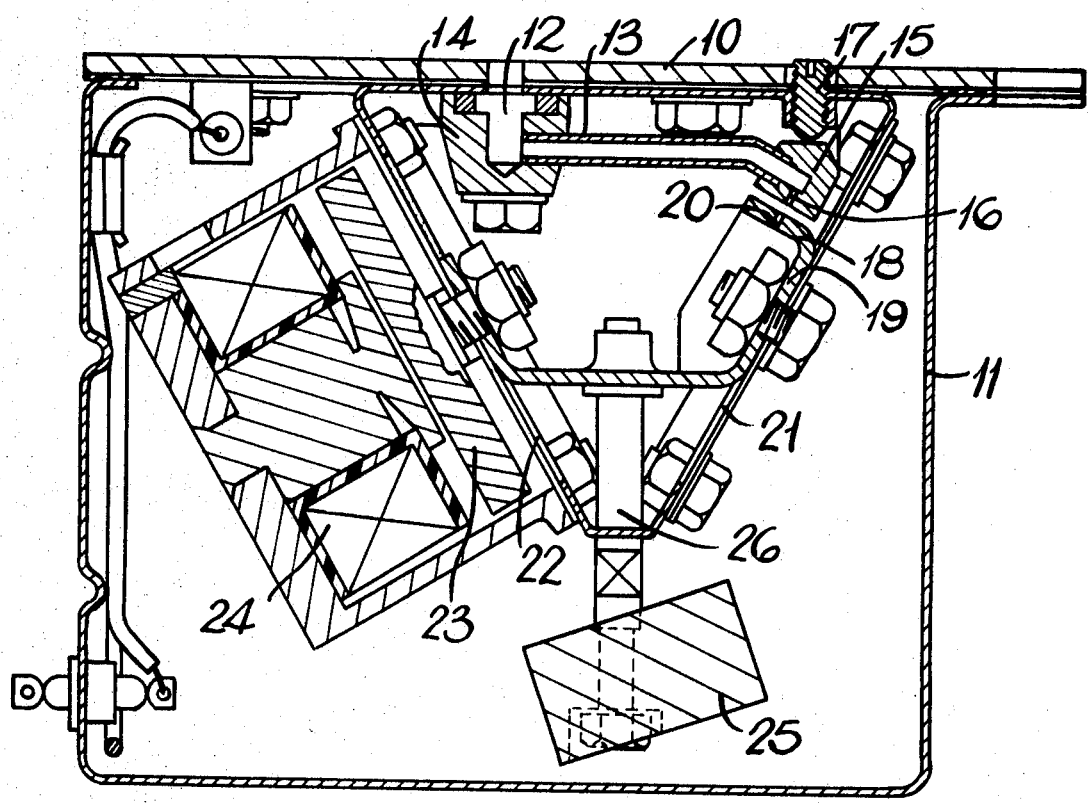

SOLENOID OPERATED VALVE WITH PLURAL DIAPHRAGM SUPPORTS

This invention relates to valves of the kind comprising a pair of members having adjacent surfaces in which are formed respective apertures which can be mutually aligned to permit of the flow of fluid therethrough, and means for moving one of the members relatively to the other in a direction to move the surfaces so that the apertures move out of alignment, said other member having an entry passage for liquid communicating with the aperture therein.

The object of the invention is to provide a valve of the kind specified in a convenient form.

In accordance with the present invention a valve of the kind specified is characterized in that said member with which the entry passage communicates is mounted upon a resilient tube forming a continuation of the entry passage, and has an adjusting device acting against said member, said adjusting device being arranged to move the member such that said surfaces on the members are moved towards or away from one another.

The invention will now be described by way of example with reference to the accompanying drawing, the single FIGURE of which illustrates a valve constructed in accordance with this invention. The valve illustrated comprises a support plate 10 upon which is mounted a detachable casing 11. Through the plate 10 extends an inlet passage 12 which communicates with the interior of a resilient metal tube 13. The tube 13 is connected to the support plate by means of a member 14, and the opposite free end of the tube 13 carries a hollow block 15. In one wall of the block 15 is formed a small aperture 16, which communicates with the interior of the tube 13 through the hollow interior of the block 15.

In the support plate 10 adjacent to the block 15 is an adjusting screw 17 whereby the position of the block 15 can be varied, but the resilience of the tube 13 always urges the block 15 against the adjusting screw 17.

Adjustment of the block 15 takes place in a direction to move the surface in which the hole 16 is formed towards and away from a flange 18 on a member 19, the flange having an aperture 20 which can be aligned with the hole 16 in the block 15.

The member 19 is movable in a direction so that the surface in which the aperture 20 is formed is moved in a direction parallel with the surface in which the aperture 16 is provided. This arrangement constitutes the valve. The adjustment afforded by the screw 17 of the block 15 is in a direction perpendicular with respect to surfaces of the flange 18 and the block 15 in which the apertures are provided, thus controlling the clearance between these surfaces.

The member 19 is connected to the centers of a pair of flexible diaphragms 21, 22 whereby it is supported these diaphragms being disposed with their planes approximately 60° with respect to one another.

The end of the member 19, remote from the flange 18, is connected through the diaphragm 22 to the armature 23 of an electrical solenoid 24, the supply of current to the solenoid 24 controlling the position of the member 19 and therefore the operation of the valve. When the solenoid 24 is energized the member 19 will be caused to move under the influence of the two diaphragms 21, 22. Since these allow virtually only movement in the axial direction of the bolts connecting their centers with the member 19, the flange 18 of that member will tend to move in the direction substantially parallel with the apertured face of the block 15.

The midregion of the member, between the two diaphragms 21, 22, is connected to a counterbalance weight 25 through a pair of rods 26 disposed at opposite sides of the diaphragms 21, 22 respectively.

It is to be understood, however, that the valve can be applied to other mechanisms which have apertured parts moving relatively transversely to control flow or pressure in a passage in one of the members.

I claim:

1. A valve comprising a pair of members having adjacent surfaces in which are formed respective apertures which can be mutually aligned to permit of the flow of fluid therethrough, and means for moving one of the members relatively to the other in a direction to move the surfaces so that the apertures move out of alignment, said other member having an entry passage for liquid communicating with the apertures therein, said member with which the entry passage communicates being mounted upon a resilient tube forming a continuation of the entry passage, and having an adjusting device acting against said other member, said adjusting device being arranged to move said other member such that there is mutual movement of said surfaces on the members towards or away from one another.

2. A valve as claimed in claim 1 in which the adjusting device comprises a screw engaging a block member mounted on the tube end and on which one of said surfaces is formed.

3. A valve as claimed in claim 2 in which the other surface is formed on said member which is mounted on a pair of spaced mutually inclined diaphragms, said member being controlled by an electrical solenoid to move said member to cause the apertures in the members to move into and out of alignment.